United States Patent
Boffi et al.

(10) Patent No.: US 6,275,311 B1
(45) Date of Patent: *Aug. 14, 2001

(54) OPTICAL DEVICE FOR PROCESSING AN OPTICAL DIGITAL SIGNAL

(75) Inventors: Pierpaolo Boffi, Voghera; Guido Alberto Maier, Segrate; Mario Martinelli, S. Donato Milanese, all of (IT)

(73) Assignee: Pirelli Cavi e Sistemi S.p.A., Milan (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,131

(22) Filed: Jun. 30, 1998

Related U.S. Application Data

(60) Provisional application No. 60/051,218, filed on Jun. 30, 1997.

(30) Foreign Application Priority Data

Jun. 30, 1997 (EP) .................................... 97201988

(51) Int. Cl.$^7$ .................................... H04B 10/00
(52) U.S. Cl. .................... 359/107; 359/135; 359/138; 359/900
(58) Field of Search ................... 359/107, 108, 359/135, 136, 137, 138, 140, 900; 708/191, 212, 530; 385/14

(56) References Cited

U.S. PATENT DOCUMENTS

| | | | |
|---|---|---|---|
| 4,604,707 | * 8/1986 | Yamashita et al. | 385/14 |
| 4,764,889 | 8/1988 | Hinton et al. | 708/801 |
| 4,926,366 | 5/1990 | Cuykendall et al. | 708/191 |
| 5,032,010 | * 7/1991 | Su | 385/24 |
| 5,050,117 | 9/1991 | McAulay | 708/191 |

(List continued on next page.)

FOREIGN PATENT DOCUMENTS

| | | | |
|---|---|---|---|
| 0 742 660 | 11/1996 | (EP) | . |
| 403259127A | * 11/1991 | (JP) | 359/107 |

(List continued on next page.)

OTHER PUBLICATIONS

A. Maniatopoulos et al., "Single–bit error–correction circuit for ATM interfaces," Electronics Letters, vol. 31, No. 8, pp. 617–618 (1995) (Apr.).

A. Maniatopoulos et al., "Implementation issues of the ATM cell delineation mechanism," Electronics Letters, vol. 32, No. 11, pp. 963–965 (1996) (May).

Tong–Bi Pei et al., "High–Speed Parallel CRC Circuits in VLSI," IEEE Transactions on Communications, vol. 40, No. 4, pp. 653–657 (1992) (Apr.).

(List continued on next page.)

*Primary Examiner*—Cassandra Spyrou
*Assistant Examiner*—John Juba, Jr.
(74) *Attorney, Agent, or Firm*—Finnegan, Henderson, Farabow, Garrett & Dunner, L.L.P.

(57) ABSTRACT

An optical device to perform an asynchronous and parallel processing of a N bits serial stream of an optical digital signal comprises a) a serial to parallel converter which converts the serial stream of N bits into a first parallel pattern of N bits carrying the same information as the serial stream of N bits; b) an optical system to produce, from the parallel pattern of N bits, a first two-dimensional (2-D) image made of N rows and M columns (N×M) of bits, each column being associated to the digital optical signal by a predetermined relationship; c) a logic device to perform logic operations on the bits of the first 2-D image; and d) a device to send to an output the results of the logic operations.

66 Claims, 11 Drawing Sheets

U.S. PATENT DOCUMENTS

| | | | |
|---|---|---|---|
| 5,291,324 | * 3/1994 | Hinterlong | 359/135 |
| 5,297,068 | 3/1994 | Guilfoyle et al. | 708/191 |
| 5,446,571 | 8/1995 | Shabeer | 359/107 |
| 5,497,261 | 3/1996 | Masetti . | |
| 5,576,873 | * 11/1996 | Crossland et al. | 385/17 |
| 5,617,233 | * 4/1997 | Boneck | 359/123 |

FOREIGN PATENT DOCUMENTS

| | | | |
|---|---|---|---|
| 406095181A | * 4/1994 | (JP) | 359/107 |
| 1830526 | * 7/1993 | (RU) | 359/107 |
| WO 93/14604 | 7/1993 | (WO) . | |
| WO 95/32568 | * 11/1995 | (WO) . | |
| WO 95/33324 | 12/1995 | (WO) . | |

OTHER PUBLICATIONS

Boffi et al., "Optical Time–To–Space Converter", Optics Communications, vol. 123, No. 4/06, pp. 473–476, (Feb. 1, 1996).

Guilfoyle et al., "High–Speed Low–Energy Digital Optical Processors", Optical Engineering, vol. 35, No. 2, pp. 436–442, (Feb. 1996).

* cited by examiner

OPTICAL DEVICE FOR PROCESSING AN OPTICAL DIGITAL SIGNAL

RELATED APPLICATION

This application is based on European Patent Application No. 97201988.9 filed on Jun. 30, 1997 and U.S. Provisional Application No. 60/051,218 filed on Jun. 30, 1997, the content of which is incorporated hereinto by reference.

BACKGROUND OF THE INVENTION

1. Field of the Invention

The present invention relates to an optical device and method to perform an asynchronous parallel and free-space processing of a N bits serial stream of an optical digital signal.

2. Description of the Related Art

Owing to the wide development of optical communication system, there is felt to be a need to design a device capable of processing digital information of an optical signal at a high rate.

Electronics, the technology employed so far to process optical signal, is going to become a bottleneck in optical communication systems and networks because electronic apparatuses have a narrow bandwidth compared to the optical bandwidth available in fiber optical communication system and are usually based on serial data processing.

The employment of optics in data processing is being studied to overcome this limitations. Potentially, processing apparatuses based on optical technology have a larger bandwidth and are transparent to data bit-rate, data format and transmission encoding. Other advantages of optics versus electronics can also be exploited like, for example, electromagnetic interference immunity, low skew, absence of impedance-matching problems.

Furthermore, an important and peculiar property of optics, completely absent in electronics, is the spatial bandwidth. This property can be an important advantage for optical processing systems. In optical architectures, space can be used freely, with the only limitation of diffraction phenomena.

Spatial bandwidth has important implications in optical processing system design, since it opens the way to parallel architectures wherein each signal carrying a parallel data stream travels through a spatial channel. This may overcome the so called "Von Neumann bottleneck" which affects conventional serial architectures. That is, the interconnection system (the bus) must be time-shared among all the processing elements. This forces most of the elements to be idle most of the time. In optic parallel systems, instead, optical interconnection must not be time-shared any more, thus overcoming such bottleneck.

U.S. Pat. No. 4,764,889 discloses an optical logic arrangement comprising a plurality of reflection holograms positioned in a two-dimensional array for optically interconnecting a similar plurality of optically nonlinear self electro-optic effect devices also positioned in a two-dimensional array. Each self electro-optic effect device is responsive to control light beams received on either side of the device array for emitting an output light beam that is a nonlinear function of the control light beams.

U.S. Pat. No. 4,926,366 discloses an optical integration technique using thin film technology which is based on a nonlinear interface with a diffusive or saturated Kerr-like nonlinearity. Solid state multiplexing is implemented with thin film multi-layer stacks resulting in polarizers and phase retarders matched to the interface.

U.S. Pat. No. 5,050,117 discloses optical computing cells or logic cells which are constructed of two or more spatial light rebroadcasters (SRL's). Data or information images in the form of light are written into and read from the SRL's with the SRL's being controlled to process the data in a desired manner.

U.S. Pat. No. 5,297,068 discloses an architecture for an optical computing apparatus which utilizes global free space smart optical interconnects and is based on a digital logic family derived from augmenting semiconductor technology with optical logic. The apparatus comprises input means, control means and detector means.

U.S. Pat. No. 5,497,261 discloses synchronization apparatus for an optical communication network. Such apparatus includes a delay member applying delays to signals received in an optical form, which form is that of an optical-type carrier wave carrying the signals. The delays are controlled so that the signals are synchronized on reference instants.

U.S. Pat. No. 5,446,571 discloses an optical code recognition unit (OCRU) for recognizing a predetermined n-bit optical code sequence coded using the Manchester code format, having an n-way splitter with an input and n parallel outputs. A plurality of gates are associated with the splitter outputs, respective pairs of splitter outputs leading to each of the gates via a respective optical combiner, and any remaining single splitter output leading directly to its gate. Each of the splitter outputs is subjected to a different delay of m half bit periods, where m=0 to 2(n−1), the value of m being chosen such that, if a predetermined optical code sequence is applied to the splitter input, the "1"s in the outputs of each of the pairs of splitter outputs reach the associated AND gates and the "1" in any remaining single splitter output reaches its AND gate at predetermined times such that all the gates are turned on.

EP Patent No. 0 742 660 A1 discloses a signal processor for the processing of digital signal in the physical (for example, optical) domain. This is inter alia relevant for Asynchronous Transfer Mode (ATM) systems in which control codes such as Virtual Path Identifiers (VPIs) and Virtual Channel Identifiers (VCIs) at the inputs of subsystem have to be changed. A symbol stream is lead through different delay branches. The number of delay branches is of such magnitude that at each moment, in at least one of the branches, both a "1" symbol and a "0" symbol is available. By the controlled opening and closing of the switches the symbol values can be changed.

WO 93/14604 discloses an optical code recognition unit (OCRU) for recognizing a predetermined n-bit optical code having an n-way splitter with an input and n parallel outputs. A plurality of combiners are associated with the splitter outputs, and a respective gate is controlled by the output of each of the combiners. Each of the splitter outputs is subjected to a different delay of from 0 to (n−1) bit periods, and each combiner receives an input from at least one of the splitter outputs. The OCRU is such that all the gates are turned on if a predetermined optical code is applied to the splitter input.

WO 95/33324 discloses a packet carried on an optical network which is routed by carrying out a logic operation on an address word carried in a packet header, and a predetermined discriminator word. A binary routing decision is made in accordance with the product of the logic operation.

Pei T. B. et al., "High-speed parallel CRC circuits in VLSI", IEEE Transactions on Communications, 40, No. 4, 653–657 (1992) investigate the use of VLSI technology to speed up cyclic redundancy checking (CRC) circuits used for error detection in telecommunications systems. The Authors show that parallel architectures fall somewhat short of ideal speedups in practice, but they should still enable current CMOS technologies to go well beyond 1 Gb/s data rates.

The above mentioned disclosure relates to synchronous optical signal processing.

The present invention aims at exploiting the above mentioned advantages offered by optics with an optical device and a method to perform an asynchronous parallel and free-space processing of a N bits serial stream of an optical digital signal.

SUMMARY OF THE INVENTION

It is therefore a first object of this invention to provide an optical device to perform an asynchronous parallel and free-space processing of a N bits serial stream of an optical digital signal comprising a) a serial to parallel converter which converts said serial stream of N bits into a first parallel pattern of N bits carrying the same information as said serial stream of N bits;

characterized in that said device further comprises b) optical means to produce, from said first parallel pattern of N bits, a first free-space two-dimensional (2-D) image made of N rows and M columns (N×M) of bits; and c) means to perform logic operations on the bits of said first free-space 2-D image.

Preferably, said means to perform logic operations comprises optical means to carry out an element-by-element AND logic operation, between said first 2-D image and a second suitable 2-D image N×M thereby producing a third 2-D image N×M.

Typically, said optical means to carry out an element-by-element AND logic operation comprises a suitable spatial filter absorbing optical power from the N*M bits of said first 2-D image in locations corresponding to bits "0" of said second 2-D image and being transparent in locations corresponding to bits "1" of said second 2-D image.

Preferably, said means to perform logic operations further comprises means to perform an XOR logic operation along the M columns of said third 2-D image N×M thereby producing a second parallel pattern of M bits.

Furthermore, said means to perform logic operations further comprises means to perform an OR logic operation among the M bits of said second parallel pattern.

According to a variation, said means to perform logic operations further comprises means to photo-detect a selection of the N*M bits of said third 2-D image.

Preferably, said means to perform logic operations further comprises electrical means to perform an XOR logic operation along the M columns of said third 2-D image N×M thereby producing a second parallel pattern of M bits.

Typically, said means to perform logic operations further comprises electrical means to perform an OR logic operation among the M bits of said second parallel pattern.

Preferably, said electrical means to perform an XOR logic operation comprises a multi-input XOR logic gate having a number of inputs less or equal to N.

More preferably, said multi-input XOR logic gate is implemented cascading 2-input XOR logic gates.

Preferably, said electrical means to perform an OR logic operation comprises a M-input OR logic gate.

More preferably, said M-input OR logic gate is implemented cascading 2-input OR logic gates.

Typically, said optical means to produce a first free-space 2-D image comprises means to clone M times each bit of said first parallel pattern of N bits.

Preferably, said means to clone each bit of said first parallel pattern of N bits comprises beam splitters.

More preferably, said beam splitters are made of fused optical fiber couplers.

According to a variation, said beam splitters are made of integrated optic couplers.

According to an embodiment, said optical means to produce a first free-space 2-D image further comprises suitable collimation means to drive said N*M bits in free-space according to a suitable direction and to keep them within a suitable transversal size.

Preferably, said collimation means comprises an optical lens.

More preferably, said optical lens is a gradient index (GRIN) type lens.

According to a variation, said optical lens is made of an array of micro-lenses.

According to another embodiment, said optical means to produce a first free-space 2-D image further comprises suitable focusing means to focus a selection of said N*M bits to said photo-detecting means.

It is a second object of the present invention to provide a method to perform an asynchronous parallel and free-space processing of a N bits serial stream of an optical digital signal comprising a) converting said serial stream of N bits into a first parallel pattern of N bits carrying the same information as said serial stream of N bits;

characterized in that said method further comprises b) producing, from said first parallel pattern of N bits, a first free-space 2-D image made of N rows and M columns (N×M) of bits; and c) performing logic operations on the bits of said first free-space 2-D image.

BRIEF DESCRIPTION OF THE DRAWINGS

The invention will now become more evident from the following description and the enclosed drawings, having the aim of describing and showing some preferred embodiments without, however, limiting it in any way.

DETAILED DESCRIPTION OF THE INVENTION

Figure 1:
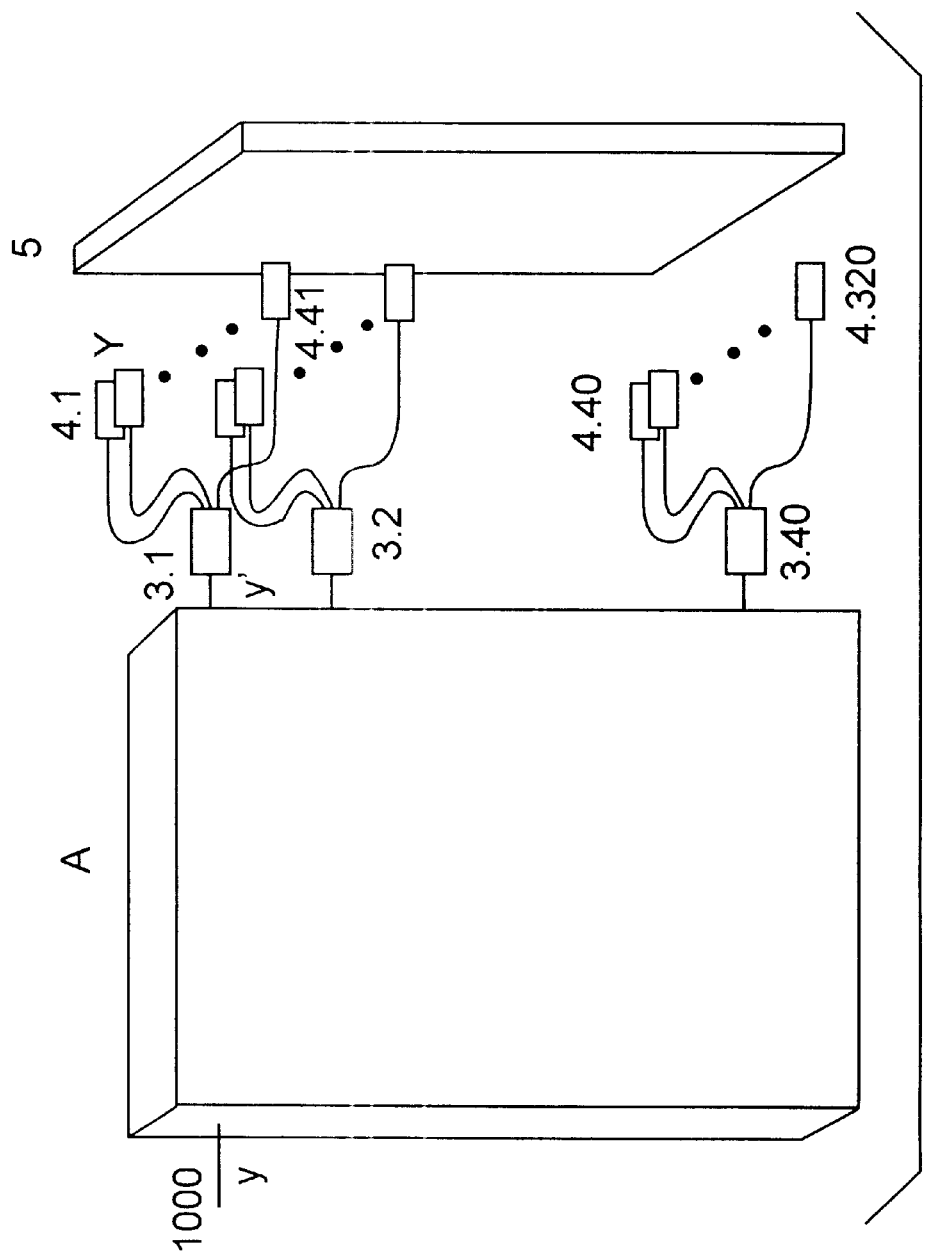
FIG. 1 is a schematic diagram of an optical device according to a first embodiment of this invention.

According to a first embodiment shown in FIG. 1, the device of this invention comprises a serial to parallel converter A which converts a serial stream y of 40 binary bits, of an input optical communication signal 1000, in a parallel pattern y' of 40 binary bits carrying the same information as said serial stream y of 40 bits.

As shown in FIG. 4, the converter A clones the optical signal 1000 carrying the 40 bits serial stream y in 40 replica signals and delays the $i^{th}$ (i=1 ... 40) replica of a time slot $\tau=(i-1)*T$, where T is one-bit time slot, so as to produce the parallel pattern y'.

Figure 4A:
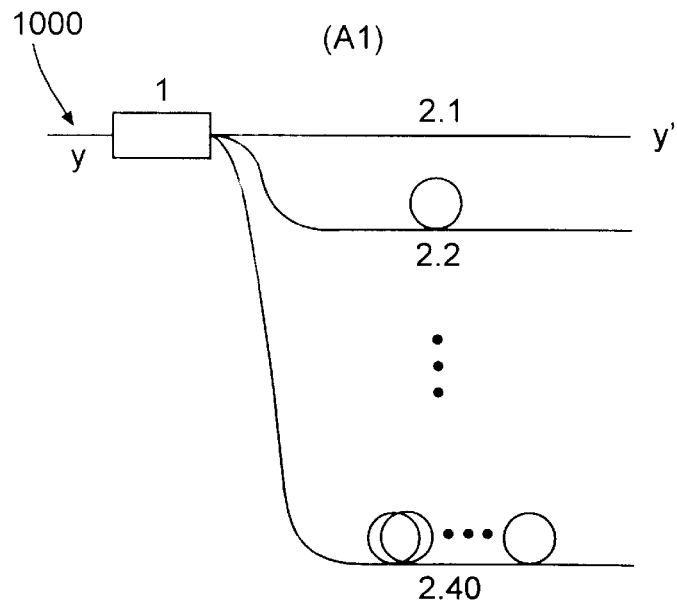
FIGS. 4a and 4b are diagrams of two embodiments of a serial to parallel converter in the device of this invention.
Figure 4B:
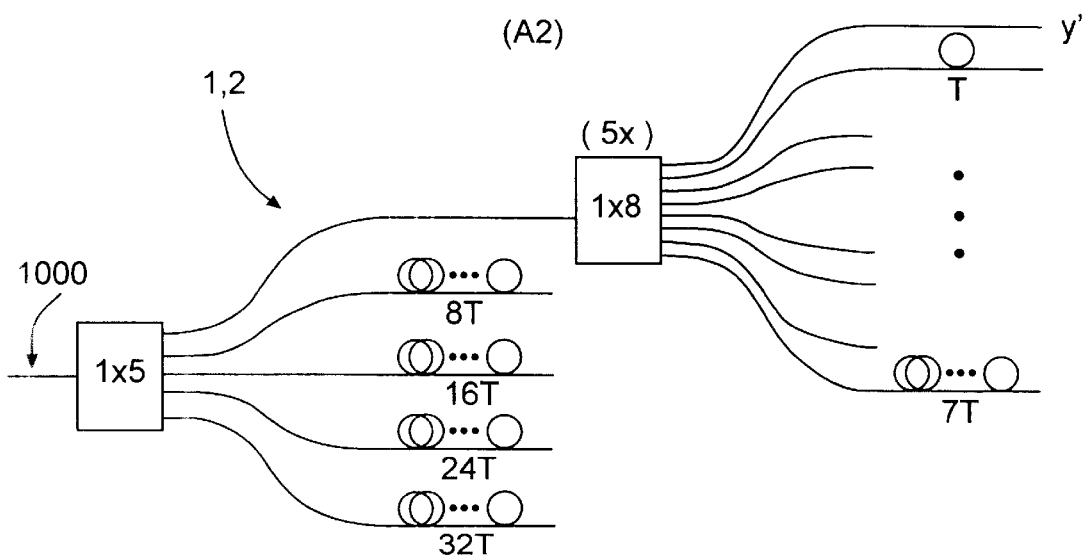
Figure 5A:
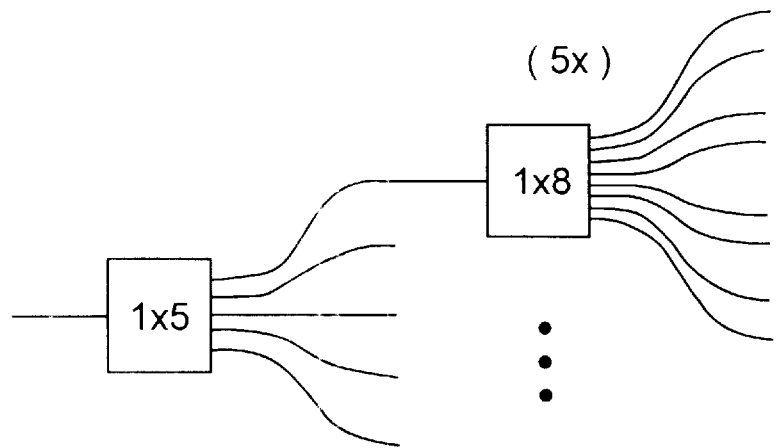
FIGS. 5a, 5b, and 5c are diagrams of different embodiments of beam splitters in the device of this invention.
Figure 5B:
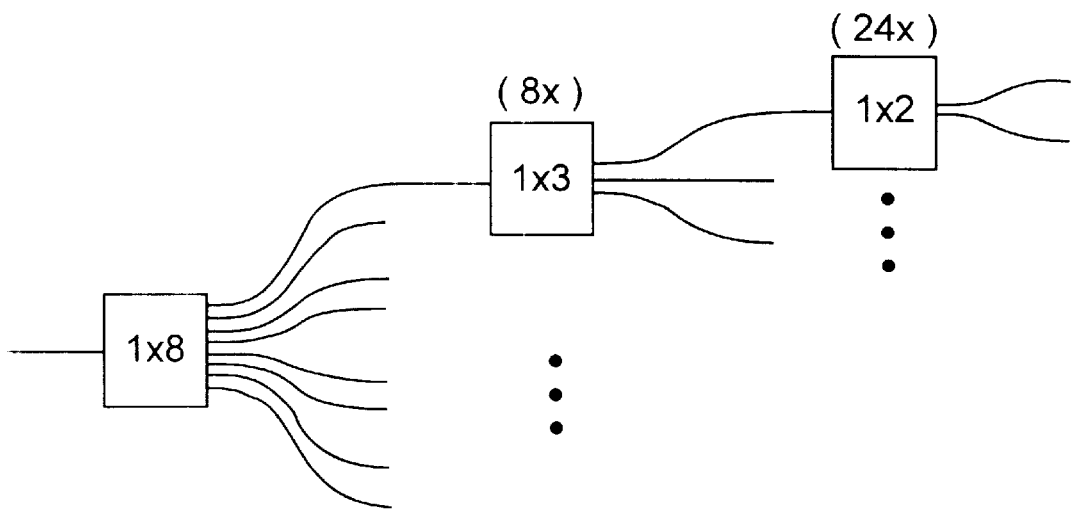

Preferably, the optical signal 1000 is cloned by a 1×40 beam splitter 1 made, for example, of a single 1×40 fused optical fiber coupler (FIG. 4*a*) or more fused optical fiber coupler so as to produce a 1×40 beam splitter (FIG. 4*b*). For example, cascading one 1×5 fused coupler with five 1×8 fused couplers (FIG. 5*a*) or cascading a 1×8 fused coupler with eight 1×3 fused couplers and with twenty-four 1×2 fused couplers (FIG. 5*b*). In the latter case eight outlets will not be used.

Figure 5C:
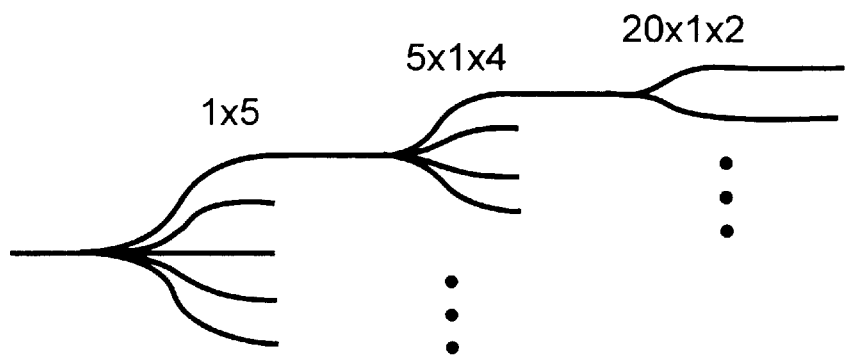

According to a variation, the 1×40 beam splitter 1 can also be made by integrated optics, a cascading 1×5, 1×4 and 1×2 bifurcation coupler as shown in FIG. 5*c*, or by means of holographic diffraction technology (not shown).

The 40 replica signals from beam splitter 1 are delayed by a number of optical delay lines 2 (FIG. 4) made of suitable length of optical fiber as well as of suitable integrated optic wave guide. To avoid coupling loss between said beam splitter 1 and delay line 2, an optical fiber delay line is preferably connected to a fused optical fiber coupler while a wave guide delay line is connected to an integrated optic beam splitter.

According to FIG. 4*a*, the "i" replica from the single 1×40 fused optical fiber coupler 1 is connected to an optical fiber 2.i having a length such as to delay said "i" replica of the time slot $\tau=(i-1)*T$, as mentioned above.

When more fused optical fiber couplers are cascaded to obtain a 1×40 beam splitter, the optical delay lines are arranged in a similar way to that shown, for example, in FIG. 4*b*.

The 40 differently delayed replica signals are connected to 1×8 beam splitters 3.1–3.40 which clone eight times each replica signal thereby producing 320 (i.e. 40*8) cloned optical signals (FIG. 1).

Such 1×8 beam splitters 3.1–3.40 are preferably fused optical fiber couplers. According to a variation, they can also be made by means of integrated optics as well as by means of holographic diffraction technology (not shown).

As shown in FIG. 1, suitable collimation means 4 (4.1–4.320) drives in free-space said 40*8 cloned optical signals and keeps them within suitable transversal size thereby producing in the space a two-dimensional (2-D) image Y having 40 rows and 8 columns (40×8). Therefore, the free-space 2-D image Y is produced putting eight times, side by side, the parallel pattern y' of 40 bits.

Such collimation means can be selected from the group consisting of a bulk lens (such as a convex lens or a GRIN lens) and an array of microlenses (not shown).

A spatial filter 5 (FIG. 1) performs an element-by-element AND logic operation between said 2-D image Y and a predetermined 40×8 2-D image H' thereby producing a 40×8 2-D image C.

Figure 6:
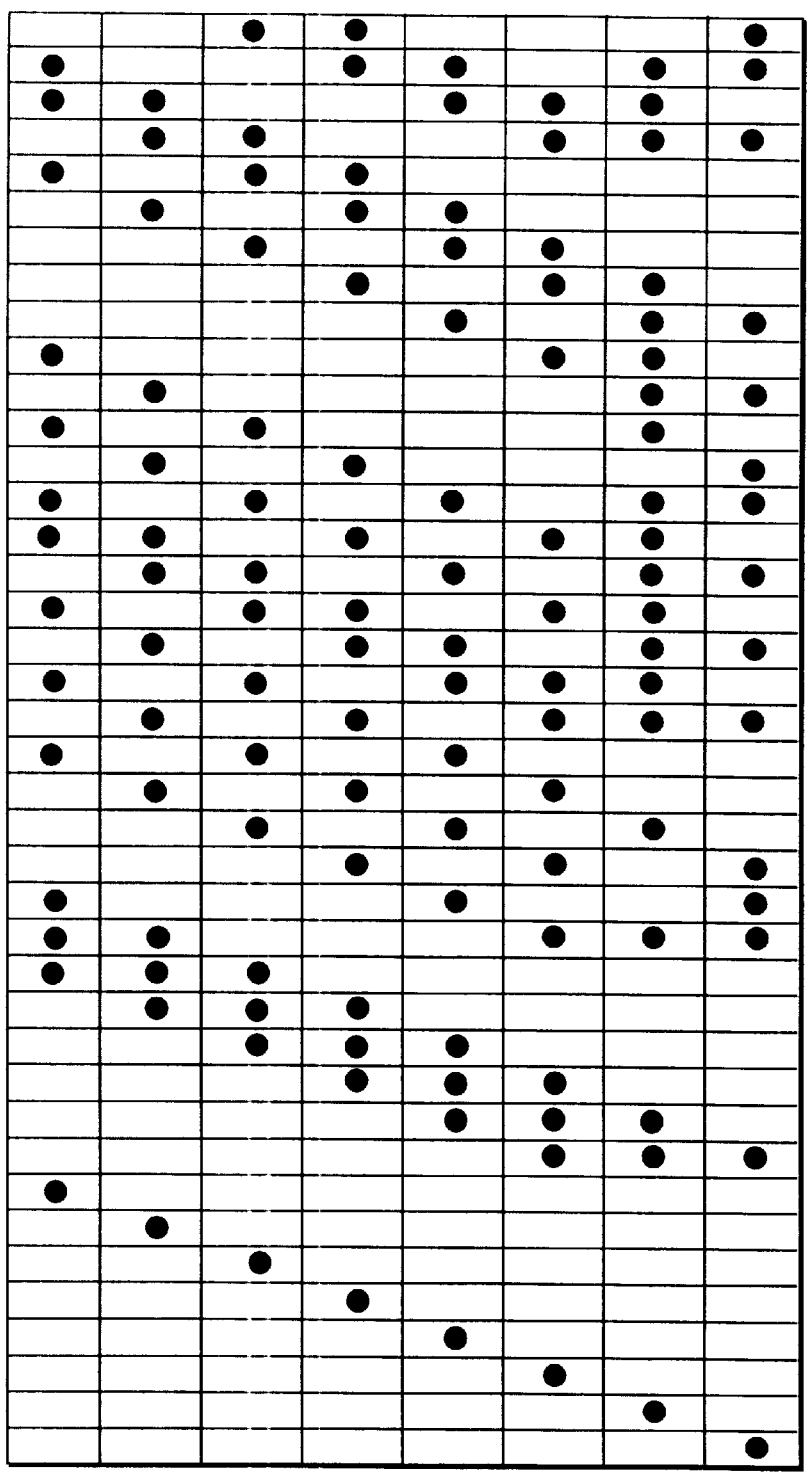
FIG. 6 is a diagram of an embodiment of a free-space 2-D image H' in the device of this invention.

An example of such 2-D image H' is shown in FIG. 6 wherein a dot represents a "one" element in the corresponding location of the 2-D image H' and a blank represents a "zero" element.

In locations corresponding to the zeros of the 2-D image H', the spatial filter 5 absorbs optical power from the 40*8 cloned optical signals forming said 2-D image Y. By converse, in locations corresponding to the ones in the 2-D image H' the spatial filter 5 is transparent.

Passing through the spatial filter 5, therefore, the 40*8 cloned optical signals form the free-space 2-D image C representing the result of the logical operation (Y AND H').

Figure 2:
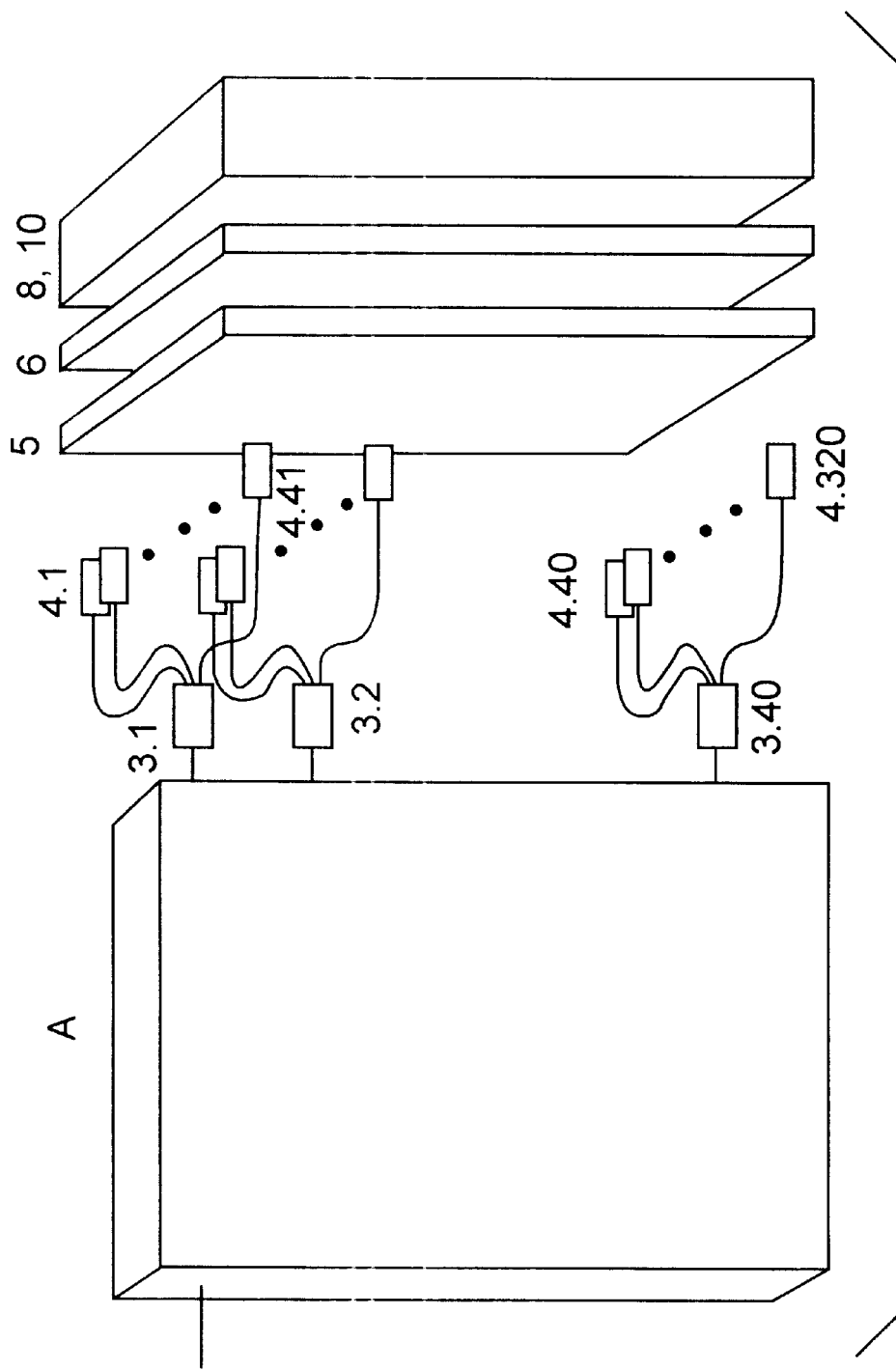
FIG. 2 is a schematic diagram of an optical device according to a second embodiment of this invention.

According to a second embodiment of this invention, the 40*8 cloned optical signals after passing through the spatial filter 5 and, therefore, forming said 2-D image C, are converted into 40*8 current signals by suitable photo-detectors 6 (FIG. 2).

In this case, the size of said collimation means 4 are preferably such as to keep the 40*8 cloned optical signals within the photo-detector size.

Preferably, said photo-detectors operate at optical communication signal wavelengths (about 1300 and 1550 nm) and have bandwidth such as to operate at high bit-rate. For example, InGaAs photo-detectors are suitable to detect about 1550 nm signal wavelength and to operate up to 20 Gbit/s in a discrete, non-integrated, arrangement. The bandwidth of an integrated array of photo-detectors may be limited due to power dissipation problems. Photo-detector arrays capable of operating at high bit-rate of 2.5 Gbit/s are presently available.

Figure 7:
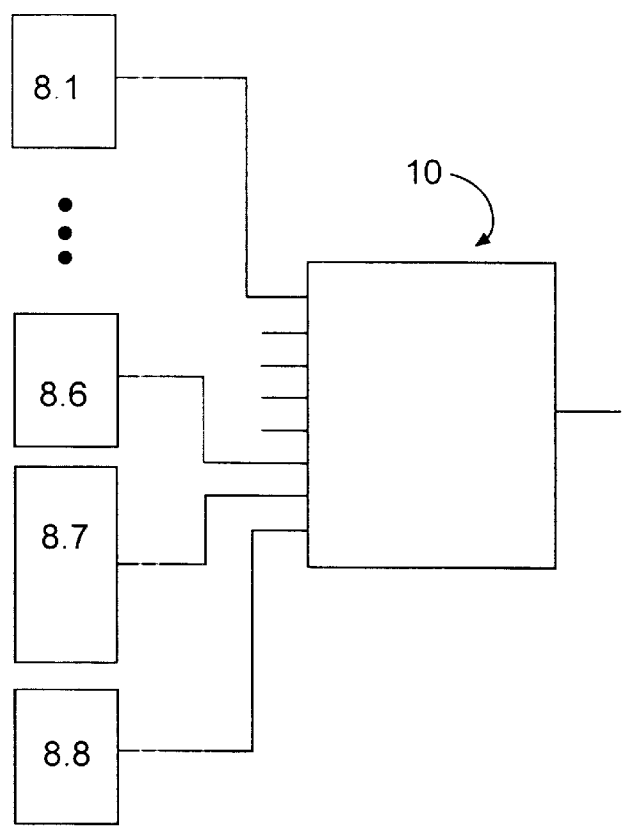
FIG. 7 is a schematic diagram of suitable means to carry out XOR and OR logic operations in the device of FIG. 2.

According to the second embodiment of this invention, said 40*8 current signals from said photo-detectors 6 are connected to eight suitable electrical multi-input XOR logic gates 8.1–8.8 and to a suitable 8-input OR logic gate 10 (FIG. 7).

Each logic gate 8.1–8.8 carries out an XOR operation among a selection of the 40 bits of each of the eight columns of said 2-D image C thereby producing a spatial pattern s of 8 bits.

Since logic zero is the neutral element of XOR operation, only logic one elements of C should be taken in to account. As mentioned above, C is the result of an element-by-element AND operation between the 2-D image Y and the predetermined 2-D image H' of FIG. 6. Therefore, an element of C is always zero, independently from the 2-D image Y, when the corresponding element in the 2-D image H' is zero.

When the position of zero elements in H' is known and unchangeable, it is possible to eliminate a number of elements of C (those corresponding to zeros in H') from the XOR operation without altering the result. Moreover, photo-detectors 6 can photo-detect only the cloned optical signals, forming said 2-D image C, which correspond to one elements in H'.

For example, in FIG. 6 it can be seen that the seventh column of H' has 20 one elements while all the other columns have 16 one elements or less. This has a very favorable impact on reducing the complexity of the structure needed to implement the XOR operations along the columns of the 2-D image C.

Thus, according to the fixed 2-D image H' of FIG. 6, the XOR logic gate 8.7 has 20 inputs while the XOR logic gates 8.1–8.6 and 8.8 have each 16 inputs (any of these gates will be hereinafter indicated as 8). When the inputs are less than 16, owing to the multi-input XOR logic gate properties, the redundant inputs can be set to logic 0.

Table 1 shows the connections between the current signals from photo-detectors 6, forming said 2-D image C, and the XOR logic gates 8.1–8.8. The coordinate couples indicates the location (row, column) in the 2-D image C of the current signals which are connected to a certain input of one logical gate 8.1–8.8.

Figure 12:
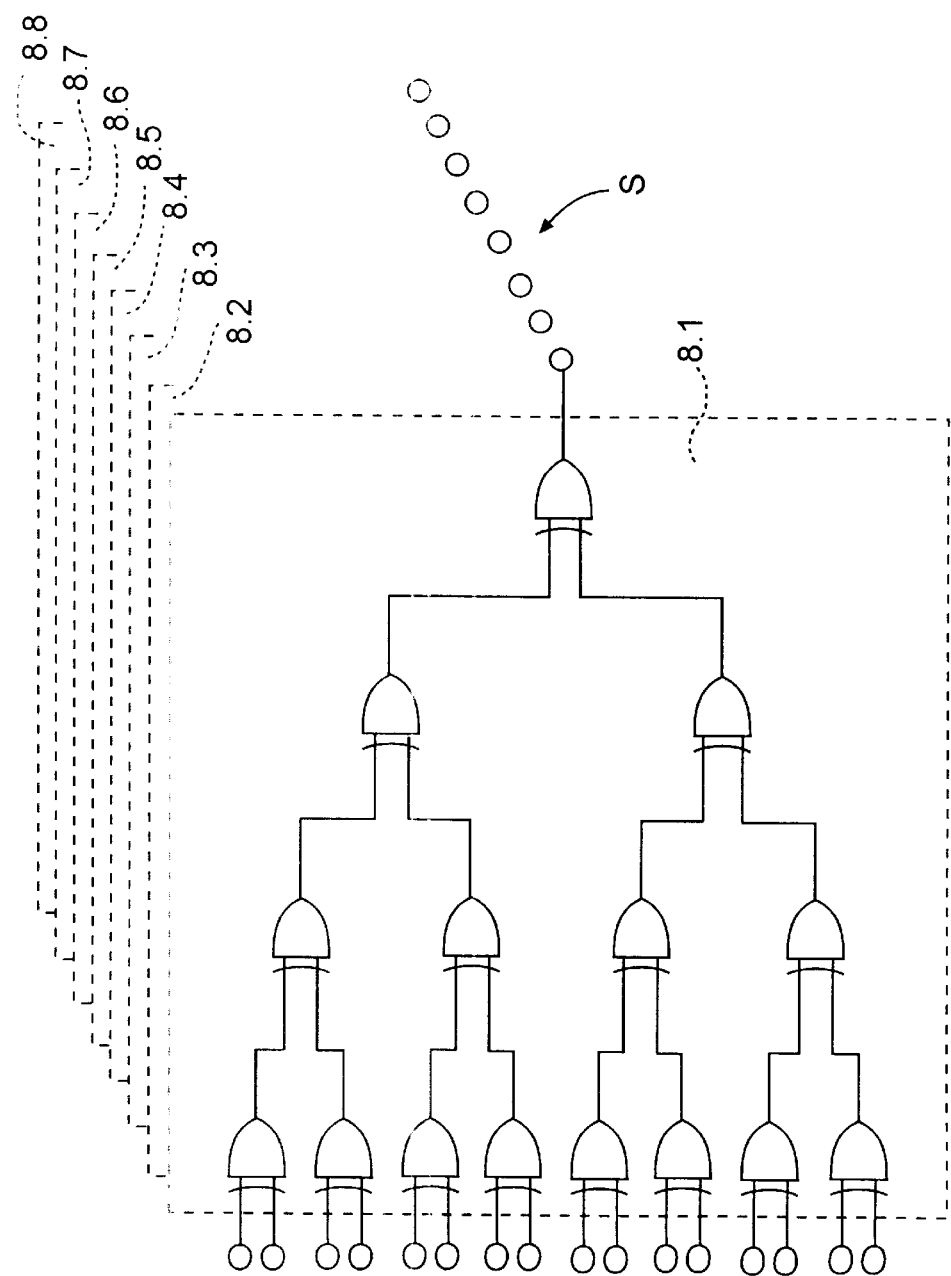
FIG. 12 is a diagram of an array of XOR logic gates of FIG. 9.

The XOR logic gates 8.1–8.8 are, preferably, arranged on the space as an array of 16-input/20-input XOR logic gate as shown in FIG. 12.

Figure 8:
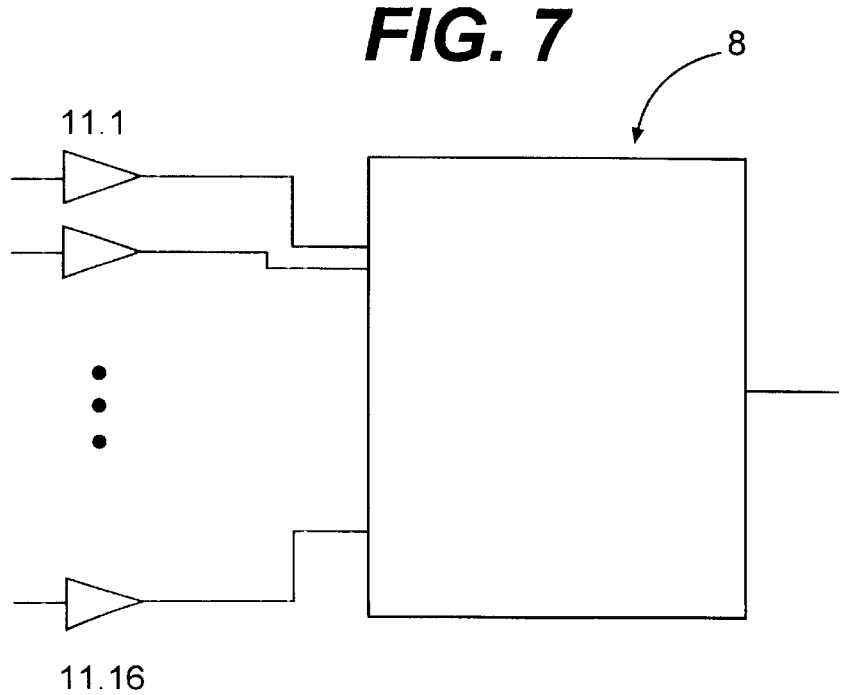
FIG. 8 is a schematic diagram of suitable amplifying means in the device of FIG. 2.

As shown in FIG. 8, the 16 input current signals to logic gates 8 are amplified by trans-impedance amplifiers 11.1–11.16 which convert the current signals from photo-detectors 6 into voltage signals required to drive the XOR logic gate 8.

The amplifiers 11.1–11.16 are preferably made by means of GaAs electronic technology. For example, ATA amplifiers by ANADIGICS which can operates up to about 2.5 Gbit/s. Discrete amplifiers operating up to 22 GHz are available (see, e. g., B. Klepser et al., "High speed, monolithically integrated pin-HEMT photoreceiver fabricated on InP with a tunable bandwidth up to 22 GHz using a novel circuit design", Eighth International Conference on InP and Related Materials, page. 443, April, 1996).

Figure 9:
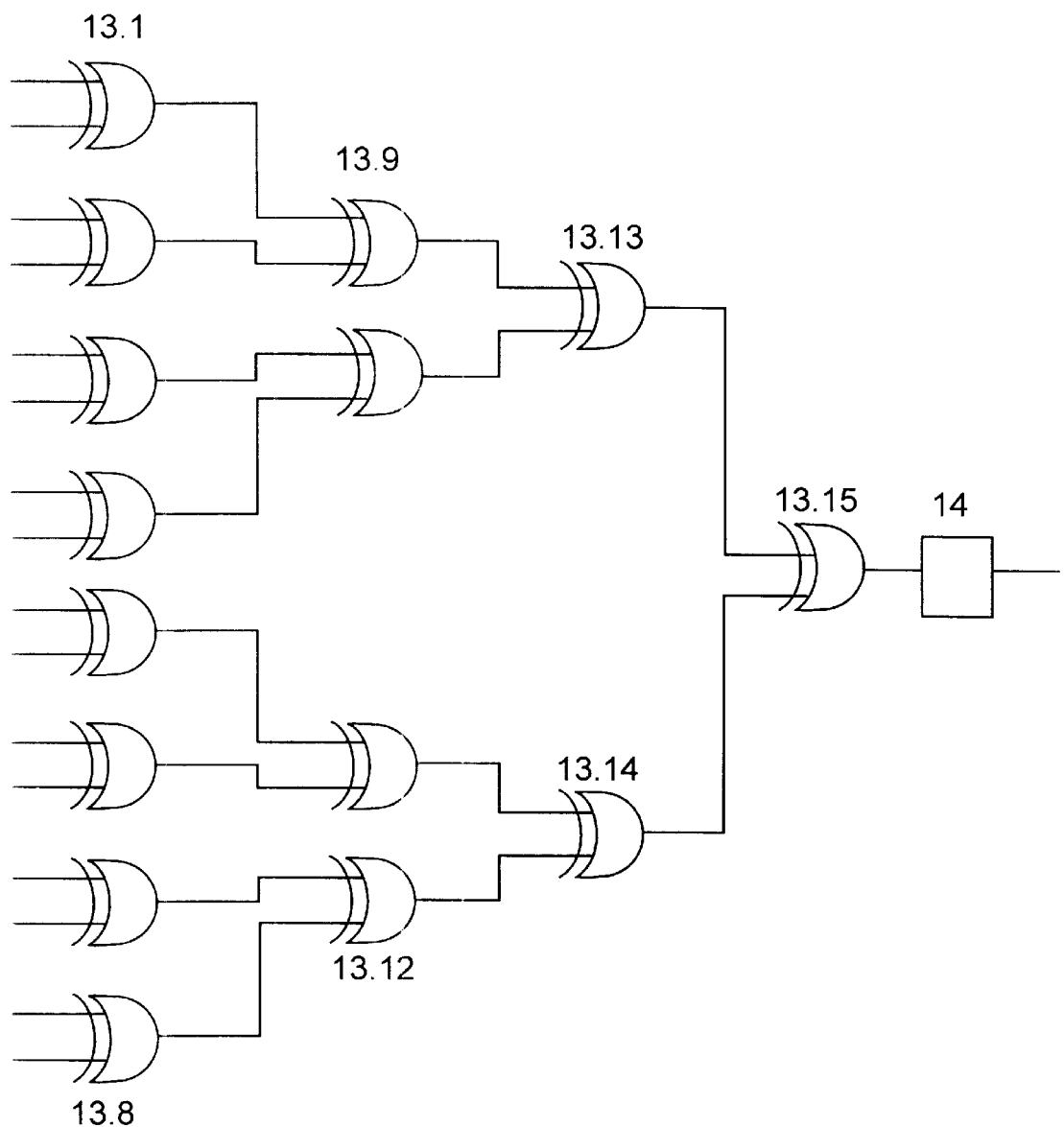
FIG. 9 is a diagram of an embodiment of means to carry out a 16-input XOR logic operation in the device of FIG. 2.
Figure 10:
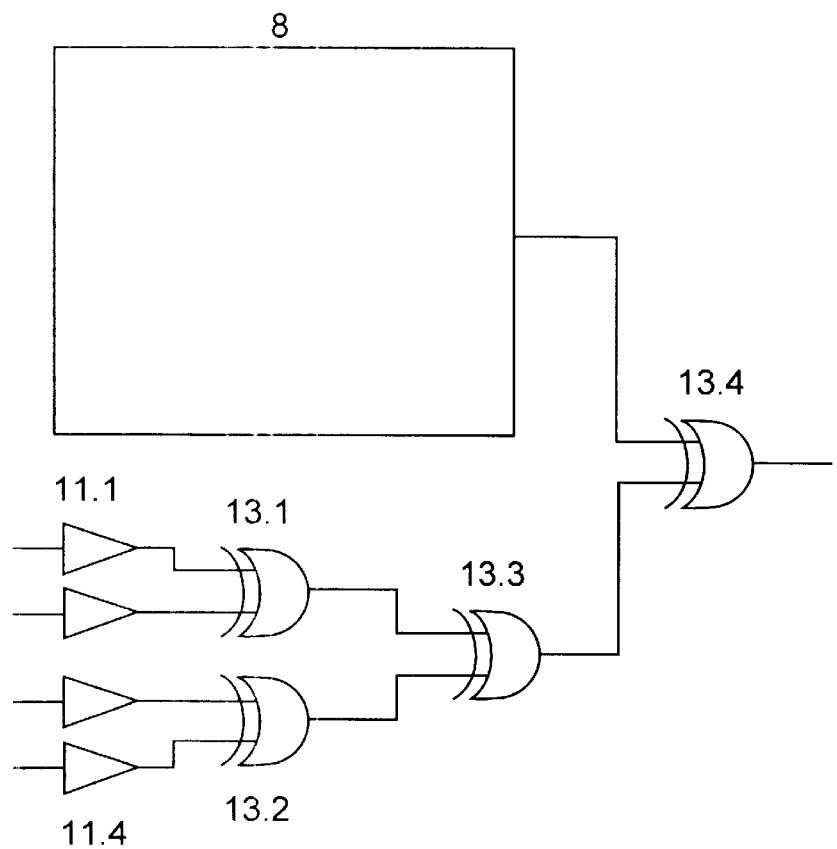
FIG. 10 is a diagram of an embodiment of means to carry out a 20-input XOR logic operation in the device of FIG. 2.

Typically, a 16-input XOR logic gate 8 is implemented by cascading 2-input XOR logic gates 13.1–13.15 (FIG. 9) while the 20-input XOR logic gate 8.7 is implemented by means of a logic gate 8 connected to four more amplifiers 11.1–11.4 and 2-input XOR logic gates 13.1–13.4 (FIG. 10).

In order to synchronize the 16-input XOR logic gates 8 to the 20-input XOR logic gate 8.7, the logic gates 8 outputs are connected to an electronic delay line 14 (FIG. 9) performing a time delay substantially equal to the electrical signal propagation time in the 2-input XOR logic gate 13. For example, such delay can be obtained by cascading a suitable number of buffers, i.e. pairs of inverters built using the same logic technology as used in the 2-input XOR logic gates.

Once said parallel pattern s with 8 bits has been produced, by carrying out said XOR operations along the columns of the 2-D image C, the 8-input OR logic gate 10 performs an OR logic operation on the elements of said parallel pattern s thereby producing an output bit from the device of FIG. 2.

Figure 11:
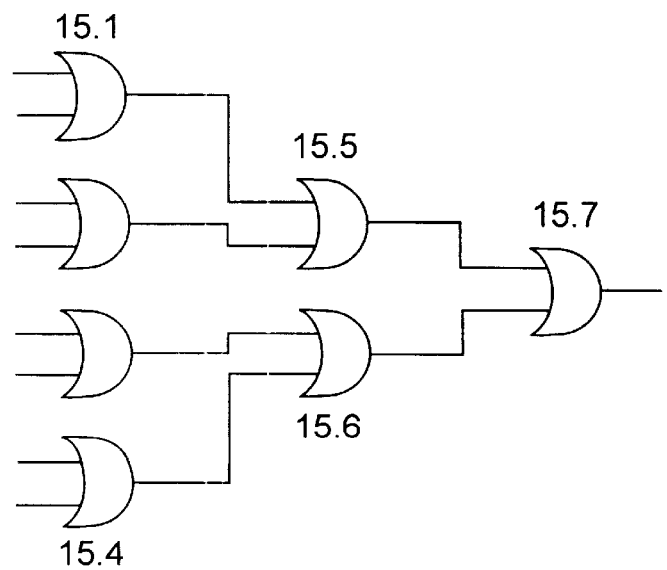
FIG. 11 is a diagram of an embodiment of means to carry out a 8-input OR logic operation in the device of FIG. 2.

As shown in FIG. 11, the 8-input OR logic gate is, typically, implemented cascading 2-input OR logic gates 15.1–15.7.

Preferably, the 2-input XOR and OR logic gates 13 and 15 are made by means of GaAs electronic technology suitable to operate at high bit-rate as, for example, about 10 Gbit's.

Figure 3:
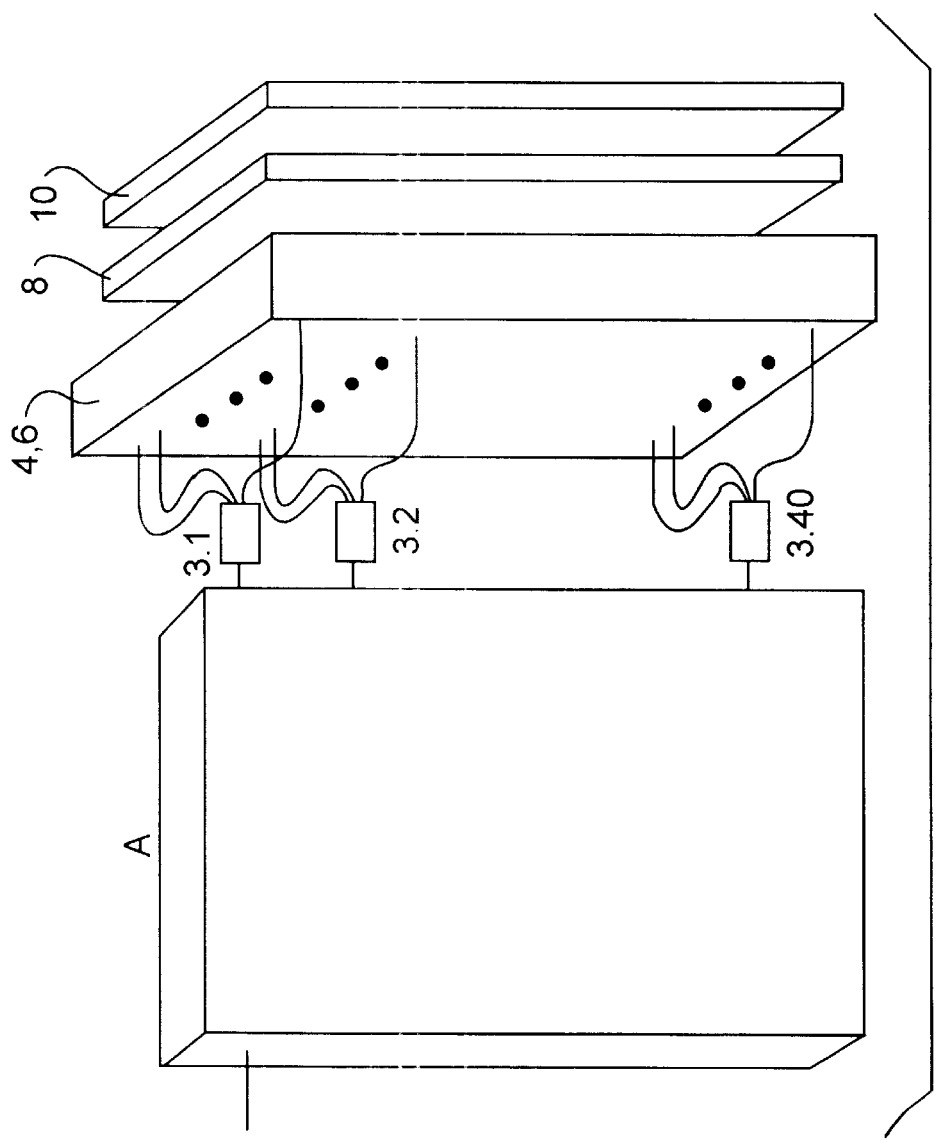
FIG. 3 is a schematic diagram of an optical device according to a third embodiment of this invention.

According to a third embodiment of the present invention, when the position of zero elements in said 2-D image H' is known and unchangeable the AND operation is carried out by optically terminating the outputs of said 1×8 beam splitters 3.1–3.40 which correspond to logic zero elements in H'. While those output cloned optical signals from said 1×8 beam splitters 3.1–3.40 which correspond to logic one elements in H' are focused by suitable focusing means (4) to a suitable number of said photo-detectors 6. (FIG. 3) Similarly to what described above, the photo-detected cloned optical signals are then connected to suitable electrical multi-input XOR logic gates 8.1–8.8 and to a suitable 8-input OR logic gate 10.

The person skilled in the art will understand that this invention allows performing any logic operation in an asynchronous and parallel way.

In particular, the device of this invention allows a parallel and asynchronous correlation of a received binary stream of bits with a number of predetermined binary sequences of bits.

For example, the device of the present invention may be used to detect in a received binary sequence of bits one of a series of M independent predetermined binary sequences.

In an other example, the device of the present invention may be used to implement a decoding algorithm in the switching communication protocols "Asynchronous Transfer Mode" (ATM).

More in particular, the device of the present invention can be used to perform an asynchronous parallel and free-space decoding of a Header Error Control (HEC) sequence in ATM.

ATM is today a promising switching technique and consist in packing digital data streams into predetermined size data packets (cells) consisting of a 43 byte long payload and a 5 byte long header. The header comprises various fields containing information used by the nodes of the network to control switching of the cell.

A means of protecting information contained in the header of the cell from transmission errors is of strategic relevance in ATM. An error occurring in this part of the cell would cause an invalid switching operation with potentially serious effects over the network traffic.

The Header Error Control (HEC) is the cyclic code used in ATM to protect the cell headers from transmission errors. Header Error Control operations are:

on the transmitted cell: HEC sequence generation. The HEC sequence is the result of a cyclic code applied to the first four bytes (32 bits) of the header. The 8-bits binary sequence so obtained (HEC sequence, or simply HEC) is added at the end of the header and becomes the last byte of the header itself;

on the received cell: HEC sequence decoding (error detection or error correction). The decoding operation is performed on each received header using the HEC sequence. The cyclic code chosen in the ATM standard enables the detection of two errors or the correction of a single error. Usually the node performs correction upon incoming headers. Detection is performed only when a sequence of multiple consecutive cells containing errors is found. This mechanism is employed in order to better protect the cell flow against bursts of errors.

The switching nodes of optical broad-band networks of today receive as input high bit-rate optical digital data streams. Cyclic code decoding operation must be performed on such data streams. The design of an efficient and fast decoder is therefore an interesting and important problem.

The code $\Theta(n, k)$ (where k indicates a k bits data stream and n indicates a sequence of n bits that represents the k bits word) used in ATM is systematic, i.e. a copy of the coded information word is contained in the first k digits of the code word, and cyclic, i.e. any cyclical shift of a code word generates another code word.

The most commonly used formalism for cyclic codes theory is based on binary polynomials wherein each stream of bits corresponds to a polynomial in the undefined variable D with binary coefficients. Thus the n−1 degree polynomial $x(D)=x_{n-1}D^{n-1}+\ldots x_1D+x_0$ represent the n bits word (serial stream of n bits) $x=x_{-1}\ldots x_1x_0$.

Between the polynomials all the operations can be performed according to standard algebraic rules, but always employing modulo-2 arithmetic.

A cyclic code $\Theta(n, k)$ is entirely defined by means of a single polynomial g(D), named generator polynomial. It has degree n−k (n−k+1 coefficients) and the highest degree coefficient is always 1. It has therefore the form: $g(D)=D^{n-k}+\ldots+1$.

In the transmitter, an information word, represented by its corresponding polynomials u(D), is encoded in a systematic cyclic code as: $x(D)=D^{n-k}u(D)+r(D)$. The latter polynomial r(D) is the remainder of the division between $D^{n-k}u(D)$ and the generator polynomial g(D):

$$D^{n-k}u(D) = q(D)g(D) + r(D) \Rightarrow r(D) = \mathrm{mod}\left[\frac{D^{n-k}u(D)}{g(D)}\right]$$

where q(D) is the quotient.

The encoding operation is performed in the transmitter evaluating r(D) by means of a suitable algorithm. The word corresponding to the polynomial r(D) is the n−k bits HEC sequence, which is then transmitted immediately after the first four bytes of the header.

The input of the header decoder into the receiver is the coded word corrupted by transmission errors: y(D)=x(D)+e(D), where e(D) correspond to a random n bits stream with all zero elements except where transmission errors occurred.

The decoding operation in the receiver is carried out calculating a polynomial named syndrome. This polynomial, s(D), can have maximum degree n−k+1. Within the limits of correction capacity of the chosen code, the received word does not contain errors if and only if syndrome polynomial has all zero coefficients.

Syndrome polynomial is the remainder of the division between the received word and the generator polynomial:

$$y(D) = m(D)g(D) + s(D) \Rightarrow s(D) = \mathrm{mod}\left[\frac{y(D)}{g(D)}\right]$$

wherein m(D) is the quotient.

This procedure is based on the circumstance that polynomials representing code words are multiple of the generator polynomial by construction (x(D)=p(D)g(D)). Thus, if no error occurred, (i.e. y(D)=x(D)) the syndrome polynomial must be zero (s(D)=0).

Figure 13:
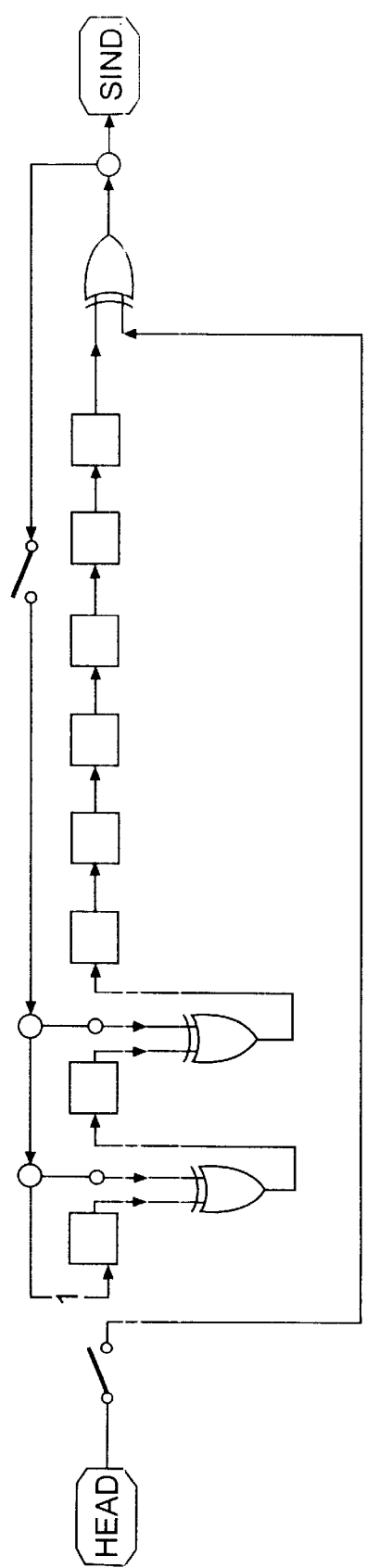
FIG. 13 is a diagram of a conventional electronic device, based on serial data processing, implementing a decoding algorithm.

So far, the decoding algorithm has been implemented by electronic digital hardware based on serial data processing (U.S. Pat. No. 5,402,429; Maniatopoulos A. et al., "Single-bit error-correction circuit for ATM interfaces", Electronics Letters, 31, No. 8, 617–618, 1995; Maniatopoulos A. et al., "Implementation issues of the ATM cell delineation mechanism", Electronics Letters, 32, No. 11, 963–965, 1996). The decoder is usually a simple dedicated DSP circuit employing a serial shift register as fundamental device, essentially able to perform a binary polynomial division. The scheme of such circuit is well known (FIG. 13). To divide two polynomials the shift register must have a number of flip-flop cells equal to the degree of the divisor, and a pattern of logic "feedback loops" configured according to the coefficients of the divisor. Each feedback loop feeds bits from the last stage of the shift register to a summing node (modulo-2 sum, or XOR). Into the summing nodes the back fed bits are added to the output of an intermediate flip-flop. Before starting the operation, all flip-flops must be cleared. The dividend bits flow sequentially into the first flip-flop starting from the most significant, and at each clock pulse they are shifted one step towards the last cell. When the last dividend bit has entered the device the division remainder bits are kept stored into the memory cells of the shift register. They can be read from the output by shifting again, after all the feedback loops have been opened.

The minimum delay intrinsically required by a serial decoding algorithm for a code $\Theta(n, k)$ is equal to n bits time slot, plus the time required to read the syndrome (n−k−1 bits time slot).

As mentioned above the conventional decoding algorithm adopted in electronic detector is based on polynomials. An alternative algorithm suitable for an optical decoding operation may be based on matrices algebra.

In matrices formalism a binary word (serial stream of n bits) "$x=x_n \ldots x_2 x_1$" can be represented by the vector "$x=[x_n \ldots x_2 x_1]$" whose elements are orderly equal to the bits of the word. By convention the first element corresponds to the most significant bit.

All the standard matrices algebra rules keep their validity and, as for polynomial formalism, modulo-2 arithmetic must be employed.

Encoding rules for a code $\Theta(n, k)$ are described synthetically by a matrix G, of size k by n (k rows and n columns), named generator matrix. In the case of a systematic code, G is composed of two submatrices: $G=[I_k|P]$ wherein $I_k$ is the identity matrix of size k by k and P (size k by n) is called parity matrix. Matrix P contains all the relevant information and it completely defines the code.

The vector x, which represents the coded word, will be obtained from the information word u by an operation of vector-by-matrix product (x=uG). After the transmission the word received will be represented by the vector y (y=x+e, wherein e represents the errors occurred during the transmission.)

As in the case of the polynomial formalism, error detection operation involves the evaluation of a syndrome word. If any of its bits is one, then an error is detected.

It can be shown that the syndrome word corresponds to a vector s of n−k elements which is obtained multiplying y by a predetermined matrix H' (s=yH'), called "parity check matrix".

According to ITU-T standards, the ATM HEC code has generator polynomial equal to "$g(D)=D^8+D^2+D+1$", corresponding to the 9 bits serial stream "100000111", and has dimension $\Theta(40,32)$. The information word u to be coded is formed by the first 32 bits serial stream (4 bytes) of the header of the ATM cell, and the code word x is composed by the entire header (serial stream of 40 bits, or 5 bytes). Furthermore, the received word y is formed of a serial stream of 40 bits, the syndrome word s of 8 bits and the parity check matrix has size 40×8.

The parity check matrix H' has been evaluated for ATM HEC code according to its generator polynomial and resulted equal to the 2-D image H' shown in FIG. 6.

As mentioned above, vector s is the result of the product of vector y by the parity check matrix H' of FIG. 6 (s=yH'), that is the result of a sequence of scalar sums and products:

$$s(i)\Sigma[y(j)*H'(i,j)] \forall 1 \leq j \leq 40;\ 1 \leq i \leq 8$$

Since modulo-2 arithmetic is being used, there is a one-by-one correspondence between scalar sums and products and logical operators XOR and AND, respectively. Therefore, vector s can be evaluated as follows:

$$s(i) = \bigoplus_{j=1}^{40} y(j) \text{ AND } H'(i, j) \quad \forall\ 1 \leq i \leq 8$$

where the symbol $$\bigoplus_{j=1}^{n}$$

has a meaning of XOR $(x_1, \ldots x_n) = x_1 \oplus x_2 \ldots \oplus x_n$ and the symbol $\oplus$ indicates the XOR operation.

In the evaluation of s, the information carried by y is used 8 times, as many as the number of elements of s, which is also equal to the number of columns of H'.

Therefore, to evaluate vector s, at first a matrix Y, of size 40×8(the same as H'), can be built by putting 8 identical columns side by side, each column being equal to y', the transposed of the row vector y (that is, Y=[y'. . . y']). Then, an element by element AND logic operation can be carried out between matrix Y and H' obtaining matrix C (C=Y AND H') of size 40×8:

$$C(i, j) = Y(i, j) \text{ AND } H'(i, j) \; \forall \begin{cases} 1 \leq i \leq 8 \\ 1 \leq j \leq 40 \end{cases}$$

Finally XOR operations can be performed along the 8 columns of C:

$$s(i) = \bigoplus_{j=1}^{40} C(i, j) \; \forall \; 1 \leq i \leq 8$$

Once the syndrome vector s has been evaluated, the last test operation can be carried out by an OR logic operation upon all its 8 elements:

out=s(1) OR s(2) . . . s(8).

The result of this last operation is the binary number out (a scalar number). If even a single bit of syndrome is equal to logic one then out equals 1; otherwise only if all the bits are zero, out is also valued 0. out may then be employed as a control signal by the rest of the ATM node. When it is zero it can be stated that the checked header does not contain errors, within the code detecting power limits.

Accordingly, such vector y, representing the received serial stream of 40 bits, may be processed by a device of this invention (FIG. 2) performing the above mentioned operation which can be briefly summarized:

1) building the transposed vector y' of the row vector y having 40 elements, that is converting the serial stream y of 40 bits into a first parallel pattern y' of 40 bits;
2) building matrix Y, of size 40×8, by putting, side by side, the 8 identical columns equal to transposed vector y' (Y=[y'. . . y']), that is producing from said first parallel pattern y' of 40 bits a first free space 2-D image Y 40×8;
3) building matrix C, of size 40×8, by carrying out an element by element AND logic operation between matrix Y and the check parity matrix H', that is producing a third 2-D image C 40×8 by carrying out an element by element AND logic operation between the first 2-D image Y and the second 2D image H' of FIG. 6;
4) building a vector s, of 8 elements, by carrying out an XOR logic operations along the columns of matrix C, that is producing a second parallel pattern s of 8 bits by implementing an XOR logic operations along the columns of the third 2-D image C;
5) evaluating the binary scalar number out by carrying out an OR logic operation upon all the elements of vector s, that is producing an output bit of the device by carrying out an OR logic operation among the 8 bits of said second parallel pattern s.

The device of this invention, based on a free-space propagation optical architecture and on a parallel data processing allow to relax the requirements on the speed of a single logic gate, without decreasing the overall communication system speed. Furthermore, in a free-space architecture, coupling between different stages implementing logic operation can be achieved easily and the physical separation between stages allows to mix different technologies. In this way the most appropriate technology for each stage can be selected according to the characteristic of the stage itself. Moreover, the architecture is independent from the particular optical technology which can be used to implement the device, and thus it keeps its validity regardless the fast progress of the optic technology.

The device of the present invention used to perform the ATM HEC decoding algorithm is faster and thus competitive versus electronic conventional devices (shown, for example, in FIG. 13). In fact, the serial stream of bits which compose the header of the ATM cell is processed in a parallel architectures which as the following advantages:

in electronic conventional devices, based on serial data processing, there are provided feedback lines. This implies that the one-bit time slot T must be higher than the signal propagation time along the whole device (e.g. 8 flip-flop and 3 XOR, in FIG. 13). By converse, in case of a parallel architecture, the bit-rate is limited by the signal propagation time through a single basic device (for example, as described above, a 2-input logic gate).

in electronic conventional devices, flip-flop must be reset at the end of a decoding operation on a HEC sequence, that is, before performing an other decoding operation on a new HEC sequence. This can make the serial sub-system operation difficult in bit-to-bit control condition. By converse, the reset operation doesn't need to be performed in the parallel architecture of the present invention.

TABLE 1

| | LOGIC GATE | | | | | | | |
|---|---|---|---|---|---|---|---|---|
| # INPUT | 8.1 | 8.2 | 8.3 | 8.4 | 8.5 | 8.6 | 8.8 | 8.7 |
| 1 | (2.1) | (3.2) | (1.3) | (1.4) | (2.5) | (3.6) | (2.7) | (1.8) |
| 2 | (3.1) | (4.2) | (4.3) | (2.4) | (3.5) | (4.6) | (3.7) | (2.8) |
| 3 | (5.1) | (6.2) | (5.3) | (5.4) | (6.5) | (7.6) | (4.7) | (4.8) |
| 4 | (10.1) | (11.2) | (7.3) | (6.4) | (7.5) | (8.6) | (8.7) | (9.8) |
| 5 | (12.1) | (13.2) | (12.3) | (8.4) | (9.5) | (10.6) | (9.7) | (11.8) |
| 6 | (14.1) | (15.2) | (14.3) | (13.4) | (14.5) | (15.6) | (10.7) | (13.8) |

TABLE 1-continued

| | \multicolumn{8}{c}{LOGIC GATE} | | | | | | | |
|---|---|---|---|---|---|---|---|---|
| # INPUT | 8.1 | 8.2 | 8.3 | 8.4 | 8.5 | 8.6 | 8.8 | 8.7 |
| 7  | (15.1) | (16.2) | (16.3) | (14.4) | (15.5) | (16.6) | (11.7) | (14.8) |
| 8  | (17.1) | (18.2) | (17.3) | (17.4) | (18.5) | (19.6) | (12.7) | (16.8) |
| 9  | (19.1) | (20.2) | (19.3) | (18.4) | (19.5) | (20.6) | (14.7) | (18.8) |
| 10 | (21.1) | (22.2) | (21.3) | (20.4) | (21.5) | (22.6) | (15.7) | (20.8) |
| 11 | (25.1) | (26.2) | (23.3) | (22.4) | (23.5) | (24.6) | (16.7) | (24.8) |
| 12 | (26.1) | (27.2) | (27.3) | (24.4) | (25.5) | (26.6) | (17.7) | (25.8) |
| 13 | (27.1) | (28.2) | (28.3) | (28.4) | (29.5) | (30.6) | (18.7) | (26.8) |
| 14 | (33.1) | (34.2) | (29.3) | (29.4) | (30.5) | (31.6) | (19.7) | (32.8) |
| 15 | — | — | (35.3) | (30.4) | (31.5) | (32.6) | (20.7) | (40.8) |
| 16 | — | — | — | (36.4) | (37.5) | (38.6) | (23.7) | — |
| 17 | | | | | | | (26.7) | |
| 18 | | | | | | | (31.7) | |
| 19 | | | | | | | (32.7) | |
| 20 | | | | | | | (39.7) | |

What is claimed is:

1. An optical device to perform an asynchronous and parallel processing of a N bits serial stream of an optical digital signal comprising:

a serial to parallel converter which converts said serial stream of N bits into a first parallel pattern having N bits carrying the same information as said serial stream of N bits;

an optical component to produce, from said parallel pattern of N bits, a first two-dimensional (2-D) image made of N rows and M columns (N×M) of bits, each column being associated to said digital optical signal by a predetermined relationship; and a device to perform logic operations on the bits of said first 2-D image including an optical portion to carry out an element-by-element AND logic operation between said first 2-D image and a second suitable 2-D image N×M, thereby producing a third 2-D image N×M, and a portion to perform an XOR logic operation along the M columns of said third 2-D image N×M, thereby producing a second parallel pattern having M bits; and an output component to send to an output the results of said logic operations.

2. An optical device according to claim 1, wherein said optical portion comprises a suitable spatial filter absorbing optical power from the N×M bits of said first 2-D image in locations corresponding to bit 0 of said second 2-D image and being transparent in locations corresponding to bit 1 of said second 2-D image to carry out an element-by-element AND logic operation in free-space.

3. An optical device according to claim 1 or 2, wherein said device to perform logic operations further comprises a component to photo-detect a suitable selection of the N×M bits of said third 2-D image.

4. An optical device according to claim 3, wherein said device to perform logic operations further comprises an electrical component to perform an XOR logic operation along the M columns of said third 2-D image N×M thereby producing a second parallel pattern of M bits.

5. An optical device according to claim 4, wherein said device to perform logic operations further comprises an electrical component to perform an OR logic operation among the M bits of said second parallel pattern.

6. An optical device according to claim 5, wherein said electrical component to perform an OR logic operation comprises a M-input OR logic gate.

7. An optical device according to claim 6, wherein said M-input OR logic gate is implemented by cascading 2-input OR logic gates.

8. An optical device according to claim 4, wherein said electrical component to perform an XOR logic operation comprises a multi-input XOR logic gate having a number of inputs less than or equal to N.

9. An optical device according to claim 8, wherein said multi-input XOR logic gate is implemented by cascading 2-input XOR logic gates.

10. An optical device according to claim 1, wherein said device to perform logic operations further comprises a component to perform an OR logic operation among the M bits of said second parallel pattern.

11. An optical device according to claim 1, wherein said optical component to produce a first 2-D image comprises a clone portion to clone M times each bit of said first parallel pattern of N bits.

12. An optical device according to claim 11, wherein said clone portion to clone each bit of said first parallel pattern of N bits comprises beam splitters.

13. An optical device according to claim 12, wherein said beam splitters are made of fused optical fiber couplers.

14. An optical device according to claim 12, wherein said beam splitters are made of integrated optic couplers.

15. An optical device according to claim 1, wherein said optical component to produce a first 2-D image further comprises a suitable collimation portion to drive said N×M bits in free-space according to a suitable direction and to keep them within a suitable transversal size.

16. An optical device according to claim 15, wherein said collimation portion comprises an optical lens.

17. An optical device according to claim 16, wherein said optical lens is made of a GRIN type lens.

18. An optical device according to claim 16, wherein said optical lens is made of a micro-lens.

19. An optical device to perform an asynchronous and parallel processing of a N bits serial stream of an optical digital signal comprising:

a serial to parallel converter which converts said serial stream of N bits into a first parallel pattern of N bits carrying the same information as said serial stream of N bits;

an optical component to expand said parallel pattern of N bits into a first two-dimensional (2-D) image made of N rows and M columns (N×M) of bits, each column being associated to said digital optical signal by a predetermined relationship, wherein bits corresponding to portions of the first 2-D image associated with a logic "0" of a second 2-D image, said second 2-D image being known and unchangeable, are stopped prior to production of the expanded 2-D image; and an output component to send to an output the expanded 2-D image.

20. A method to perform an asynchronous and parallel processing of a N bits serial stream of an optical digital signal comprising:

converting said serial stream of N bits into a first parallel pattern of N bits carrying the same information as said serial stream of N bits;

producing, from said parallel pattern of N bits, a first two-dimensional (2-D) image made of N rows and M columns (N×M) of bits, each column being associated to said digital optical signal by a predetermined relationship; and performing logic operations on the bits of said first 2-D image by carrying out an element-by element AND logic operation between said first 2-D image and a second suitable 2-D image N×M, thereby producing a third 2-D image N×M, and performing an XOR logic operation alone the M columns of said third 2-D image N×M, thereby producing a second parallel pattern of M bits; and sending to an output the results of said logic operations.

21. A method according to claim 20, further comprising carrying out an OR logic operation among the M bits of said second parallel pattern.

22. An optical device to perform processing of an N bits serial signal comprising:

serial to parallel converter that converts the N bits serial signal into an optical, parallel signal;

an image generator that creates a first 2-D image using the optical, parallel signal;

a first logic operator that optically performs a first logic operation between the first 2-D image and a predetermined second 2-D image; and a second logic operator that electrically performs a second logic operation using results of the first logic operation.

23. An optical device as claimed in claim 22, wherein the N bits serial signal is an optical signal.

24. An optical device as claimed in claim 22, wherein said serial to parallel converter comprises an optical serial to parallel converter that optically converts the N bits serial signal into the optical, parallel signal.

25. An optical device to perform processing of an N bits serial signal comprising:

a serial to parallel converter that converts the N bits serial signal into an optical, parallel signal;

a first logic operator that optically performs a first logic operation on the optical parallel signal; and a second logic operator that electrically performs a second logic operation using results of the first logic operation;

wherein the first logic operation includes an AND operation and the second logic operation includes an XOR operation.

26. An optical device as claimed in claim 25, wherein the N bits serial signal is an optical signal.

27. An optical device as claimed in claim 25, wherein said serial to parallel converter comprises an optical serial to parallel converter that optically converts the N bits serial signal into the optical, parallel signal.

28. A method to perform processing of an N bits serial signal comprising:

converting said N bits serial signal into an optical, parallel signal;

creating a first 2-D image using the optical, parallel signal;

optically performing a first logic operation between the first 2-D image and a predetermined second 2-D image; and electrically performing a second logic operation using results of the first logic operation.

29. A method as claimed in claim 28, wherein the N bits serial signal is an optical signal.

30. A method as claimed in claim 28, wherein the step of converting said N bits serial signal into an optical, parallel signal is performed optically.

31. A method to perform processing of an N bits serial signal comprising:

converting said N bits serial signal into an optical, parallel signal;

optically performing a first logic operation on the optical, parallel signal; and electrically performing a second logic operation using results of the first logic operation;

wherein the first logic operation includes an AND operation and the second logic operation includes an XOR operation.

32. A method as claimed in claim 31, wherein the N bits serial signal is an optical signal.

33. A method as claimed in claim 31, wherein the step of converting said N bits serial signal into an optical, parallel signal is performed optically.

34. An optical device to perform an asynchronous and parallel processing of a N bits serial stream of an optical digital signal comprising:

serial to parallel converter means for converting the serial stream of N bits into a first parallel pattern having N bits carrying the same information as said serial stream of N bits;

optical component means for producing, from said parallel pattern of N bits, a first two-dimensional (2-D) image made of N rows and M columns (N×M) predetermined relationship; and device means for performing logic operations on the bits of said first 2-D image including an optical portion to carry out an element-by-element AND logic operation between said first 2-D image and a second suitable 2-D image N×M, thereby producing a third 2-D image N×M, and a portion to perform an XOR logic operation along the M columns of said third 2-D image N×M, thereby producing a second parallel pattern having M bits; and output component means for sending to an output the results of said logic operations.

35. An optical devie according to claim 34, wherein said optical portion comprises a suitable spatial filter means for absorbing optical power from the N×M bits of said first 2-D image in locations corresponding to bit 0 of said second 2-D image and being transparent in locations corresponding to bit 1of said second 2-D image to carry out an element-by-element AND logic operation in free-space.

36. An optical device according to claim 34 or 35, wherein said device means for performing logic operations further comprises component means for photo-detecting a suitable selection of the N×M bits of said third 2-D image.

37. An optical device according to claim 36, wherein said device means for performing logic operations further comprises electrical component means for performing an XOR logic operation along the M columns of said third 2-D image N×M thereby producing a second parallel pattern of M bits.

38. An optical device according to claim 37, wherein said device means for performing logic operations further comprises electrical component means for performing an OR logic operation among the M bits of said second parallel pattern.

39. An optical device according to claim 41, wherein said multi-input XOR logic gate means is implemented by cascading 2input XOR logic gate means.

40. An optical device according to claim 39, wherein said M-input OR logic gate means is implemented by cascading 2-input OR logic gate means.

41. An optical device according to claim 37, wherein said electrical component means for performing an XOR logic operation comprises a multi-input XOR logic gate means having a number of inputs less than or equal to N.

42. An optical device according to claim 41, wherein said multi-input XOR logic gate means is implemented by cascading 2-input XOR logic gate means.

43. An optical device according to claim 34, wherein said device means for performing logic operations further comprises component means for performing an OR logic operation among the M bits of said second parallel pattern.

44. An optical device according to claim 34, wherein said optical component means for producing a first 2-D image comprises clone portion means for cloning M times each bit of said first parallel pattern of N bits.

45. An optical device according to claim 44, wherein said clone portion means for cloning each bit of said first parallel pattern of N bits comprises beam splitter means.

46. An optical device according to claim 45, wherein said beam splitter means are made of fused optical fiber coupler means.

47. An optical device according to claim 45, wherein said beam splitter means are made of intergrated optic coupler means.

48. An optical device according to claim 34, wherein said optical component means for producing a first 2-D image further comprises suitable collimation portion means for driving said N×M bits in free-space according to a suitable direction and to keep them within a suitable transversal size.

49. an optical device according to claim 48, wherein said collimation portion means comprises optical lens means.

50. An optical device according to claim 49, wherein said optical lens means is made of GRIN type lens means.

51. An optical device according to claim 49, wherein said optical lens means is made of micro-lens means.

52. An optical device to perform an asynchronous and parallel processing of a N bits serial stream of an optical signal comprising:

serial to parallel converter means for converting said serial stream of N bits into a first parallel pattern of N bits carrying the same information as said serial stream of N bits;

optical component means for expanding said parallel pattern of N bits into a first two-dimensional (2-D) image made of N rows and M columns (N×M) of bits, each column being associated to said digital optical signal by a predetermined relationship, wherein bits corresponding to portions of the first 2-D image associated with a logic "0" of a second 2-D image being known and unchangeable, are stopped prior to production of the expanded 2-D image;

and output component means for sending to an output the expanded 2-D image.

53. A method to perform an asynchronous and parallel processing of a N bits serial stream of an optical digital signal comprising:

the step for converting said serial stream of N bits into a first parallel pattern of N bits carrying the same information as said serial stream of N bits;

the step for producing, from said parallel pattern of N bits, each column being associated to said digital optical signal by a predetermined relationship; and the step for performing logic operations on the bits of said first 2-D by carrying out an element-by element AND logic operation between said first 2D image and a second suitable 2-D image N×M, thereby producing a third 2D image N×M, and performing an XOR logic operation along the M columns of said third 2-D image N×M, thereby producing a second parallel pattern of M bits; and the step for sending to an output the results of said logic operations.

54. A method according to claim 53, further comprising the step for carrying out an OR logic operation among the M bits of said second paralel pattern.

55. An optical device to perform processing of an N bits serial signal comprising:

serial to parallel converter means for converting the N bits serial signal into an optical, parallel signal;

image generator means for converting a first 2-D image using the optical, parallel signal, first logic operator means for optically performing a first logic operation between the first 2-D image and a predetermined second 2-D image; and second logic operator means for electrically performing a second logic operation using results of the first logic operation.

56. An optical device as claimed in claim 55, wherein th N bits serial signal is an optical signal.

57. An optical device as claimed in claim 55, wherein said serial to parallel converter means comprises an optical serial to parallel converter means to optically converting the N bits serial signal into the optical, parallel signal.

58. An optical device to perform processing of an N bits serial signal comprising:

serial to parallel converter means for converting the N bits serial signal into an optical, parallel signal;

first logic operator means for optically performing a first logic operation on the optical, parallel signal; and second logic operator means for electrically performing a second logic operation using results of the first logic operation;

wherein the first logic operation includes an AND operation and the second logic operation includes an XOR operation.

59. An optical device as claimed in claim 58, wherein the N bits serial signal is an optical signal.

60. An optical device as claimed in claim 58, wherein said serial to parallel converter means comprises optical serial to parallel converter means for optically converting the N bits serial signal into the optical, parallel signal.

61. A method to perform processing of an N bits serial signal comprising:

the step for converting said N bits serial signal into an optical, parallel signal;

the step for creating a first 2-D image using the optical, parallel signal;

the step for optically performing a first logic operation between the first 2-D image and a predetermined second 2-D image; and the step for electrically performing a second logic operation using results of the first logic operation.

62. A method as claimed in claim 61, wherein the n bits serial signal is an optical signal.

63. A method as claimed in claim 61, wherein the step for converting said N bits serial signal into an optical, parallel signal is performed optically.

64. A method to perform processing of an N bits serial signal comprising:

the step for converting said N bits serial signal into an optical, parallel signal;

the step for optically performing a first logic operation on the optical, parallel signal; and the step for electrically performing a second logic operation using results of the first logic operation;

wherein the first logic operation includes an AND operation and the second logic operation includes an XOR operation.

65. A method as claimed in claim 64, wherein the N bits serial signal is an optical signal.

66. A method as claimed in claim 64, wherein the step for converting said N bits serial signal into an optical, parallel signal is performed optically.

* * * * *